US012770557B2

(12) United States Patent
Lee et al.

(10) Patent No.: US 12,770,557 B2
(45) Date of Patent: Oct. 20, 2026

(54) DISPLAY DEVICE

(71) Applicant: LG Display Co., Ltd., Seoul (KR)

(72) Inventors: Junghyun Lee, Paju-si (KR); Seungchan Choi, Paju-si (KR); Daehwan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/371,012

(22) Filed: Oct. 28, 2025

(65) Prior Publication Data

US 2026/0212804 A1 Jul. 23, 2026

(30) Foreign Application Priority Data

Nov. 18, 2024 (KR) ........................ 10-2024-0164379

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2310/0275* (2013.01); *G09G 2310/0297* (2013.01); *G09G 2330/021* (2013.01)

(58) Field of Classification Search
CPC ................... G09G 3/32; G09G 3/2096; G09G 2310/0275; G09G 2310/0297; G09G 2330/021; G09G 3/36; G09G 3/3208; G09G 2310/08; G06F 3/0416; G06F 3/04164; G06F 3/0412; H10K 59/131
See application file for complete search history.

(56) References Cited

U.S. PATENT DOCUMENTS 9,280,954 B2 * 3/2016 Noguchi ............... G06F 3/0445
9,575,584 B2 * 2/2017 Pyo ....................... G06F 3/0443
9,690,437 B2 * 6/2017 Shin ....................... G09G 5/003
2013/0135282 A1 * 5/2013 Jeon ..................... G09G 3/3696 345/212
2014/0160061 A1 * 6/2014 Kim ...................... G06F 3/0412 345/174
2020/0184871 A1 * 6/2020 Hong .................. G09G 3/3688
2021/0074218 A1 * 3/2021 Shin ..................... G09G 3/2096
2023/0115951 A1 * 4/2023 Lin ....................... G06V 40/13 345/173

* cited by examiner

*Primary Examiner* — Antonio Xavier
(74) *Attorney, Agent, or Firm* — Fenwick & West LLP

(57) ABSTRACT

A display device includes a display panel including pixels and touch electrodes in a display area, a display driver that outputs a data voltage in a display period and outputs a touch driving signal in a touch period, and a demultiplexer between the display area and the display driver and connected between a first output terminal of the display driver and data lines of the display panel, in which the demultiplexer includes a first transistor connecting the first output terminal to a first data line based on a first control signal, and a second transistor connecting the first output terminal to a second data line based on a second control signal, in which each of the first and second control signals alternately has a first gate high and low voltages in the display period and has a second gate low voltage in a blank period after the active period.

20 Claims, 15 Drawing Sheets

DISPLAY DEVICE

CROSS REFERENCE TO RELATED APPLICATION

The present application claims priority to Republic of Korea Patent Application No. 10-2024-0164379, filed on Nov. 18, 2024, which is hereby incorporated herein for all purposes by this reference.

BACKGROUND

Field of Technology

The present specification relates to a display device.

Description of the Related Art

As the information society develops, various demands for display devices for displaying images are increasing, and various types of display devices such as liquid crystal display (LCD) devices and organic light emitting diode (OLED) display devices are utilized.

Images displayed on a display device may be still images or moving images, and the moving image may include various types such as sports images, game images, and movies. The display device may include a plurality of pixels, and a plurality of switching elements for driving the pixels.

SUMMARY

The present specification is directed to providing a display device in which it is possible to reduce sizes and power consumption of transistors by reducing deterioration of the transistors of a demultiplexer.

Objects of the present specification are not limited to the above-described objects, and other technical objects may be inferred from the following embodiments.

According to one embodiment, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between a first output terminal of the display driver and data lines of the display panel, in which the demultiplexer includes a first transistor electrically connecting the first output terminal to a first data line among the data lines based on a first control signal, and a second transistor electrically connecting the first output terminal to a second data line among the data lines based on a second control signal, in which each of the first and second control signals alternately has a first gate high voltage and a first gate low voltage in the display period and has a second gate low voltage that is smaller than the first gate low voltage in a blank period after the active period.

According to another embodiment, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between a first output terminal of the display driver and data lines of the display panel, in which the demultiplexer includes a first transistor electrically connecting the first output terminal to a first data line among the data lines based on a first control signal, and a second transistor electrically connecting the output terminal to the first data line among the data lines based on a touch control signal, in which the first control signal alternately has a first gate high voltage and a first gate low voltage in the display period, has the first gate low voltage in the touch period, and has a second gate low voltage that is smaller than the first gate low voltage in a blank period after the active period.

According to still another embodiment, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between a first output terminal of the display driver and data lines of the display panel, in which the demultiplexer includes a first transistor electrically connecting the output terminal to a first data line among the data lines based on an odd control signal, and a second transistor electrically connecting the output terminal to the first data line based on an even control signal, in which the odd control signal alternately has a first gate high voltage and a first gate low voltage in the display period of an odd frame, has a second gate high voltage in the touch period of the odd frame, and has a second gate low voltage that is smaller than the first gate low voltage in a blank period of the odd frame.

Detailed matters of other embodiments are included in the detailed description and accompanying drawings.

DETAILED DESCRIPTION

Figure 1:
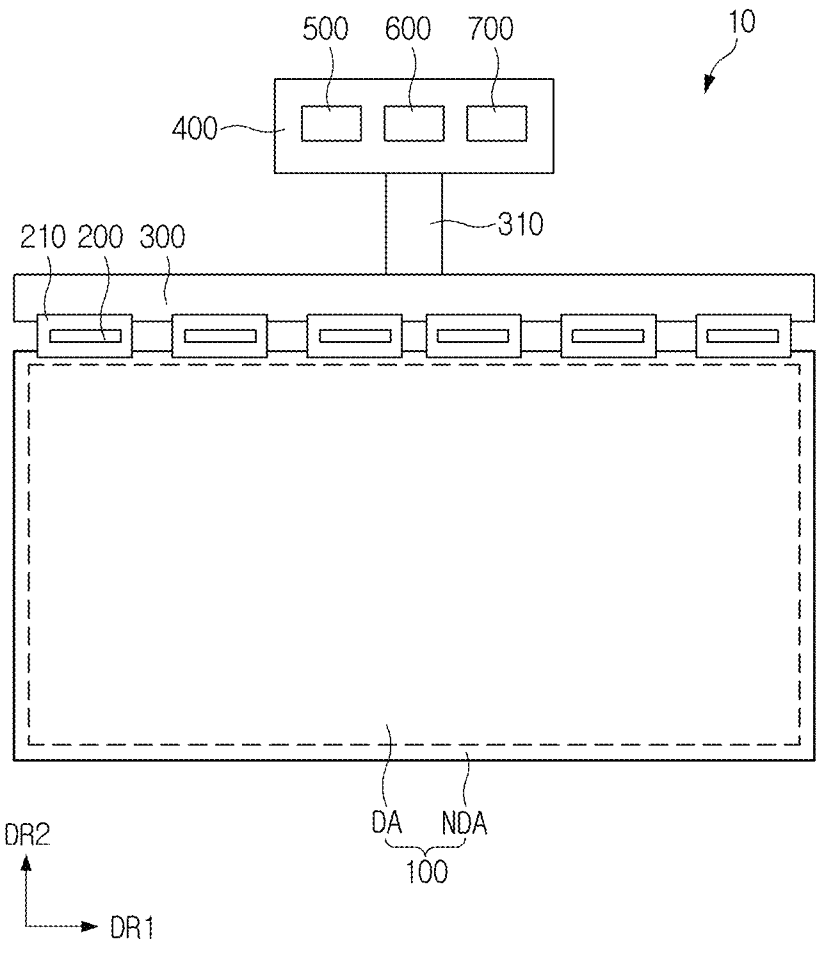
FIG. 1 is a plan view illustrating a display device according to one embodiment.

Hereinafter, embodiments will be described with reference to the accompanying drawings. In the specification, when a first component (or an area, a layer, a portion, etc.) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular includes the plural unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a plan view illustrating a display device according to one embodiment.

Referring to FIG. 1, a display device 10 may be applied to portable electronic devices, such as a mobile phone, a smart phone, a tablet personal computer (PC), a mobile communication terminal, an electronic notebook, an electronic book, a portable multimedia player (PMP), a navigation device, an ultra-mobile PC (UMPC), etc. For example, the display device 10 may be applied to a television, a laptop, a monitor, a billboard, or a display unit of the Internet of Things (IOT). As another example, the display device 10 may be applied to a wearable device, such as a smart watch, a watch phone, a glasses-type display, and a head mounted display (HMD).

The display device 10 may include a display panel 100, a display driver 200, a flexible film 210, a source circuit board 300, a flexible cable 310, a control circuit board 400, a timing controller 500, a power supply unit 600, and a memory 700.

The display panel 100 may include a display area DA and a non-display area NDA. The display area DA may include a plurality of pixels that display an image. Each of the plurality of pixels may emit light from a light-emitting area or an opening area. For example, the display area DA may include a pixel circuit including switching elements, a pixel definition film that defines a light-emitting area, and a light-emitting element.

The display driver 200 may supply a data voltage to a data line of the display panel 100. The display driver 200 may be electrically connected to the data line of the display panel 100 through a flexible film 210 and a pad part of the display panel 100. The display driver 200 may be formed as an integrated circuit (IC). For example, the display driver 200 may be attached to one surface of the flexible film 210 in a chip on film (COF) manner. The flexible film 210 may include lines electrically connecting the display driver 200 to the display panel 100. One side of the flexible film 210 may be electrically connected to the pad part of the display panel 100, and the other side of the flexible film 210 may be electrically connected to the source circuit board 300.

The source circuit board 300 may electrically connect the control circuit board 400 to the flexible film 210. The source circuit board 300 may be a printed circuit board including lines electrically connecting the display driver 200 to other devices. The source circuit board 300 may be electrically connected to the control circuit board 400 through the flexible cable 310. For example, the flexible cable 310 may be a flexible flat cable (FFC), but is not limited thereto.

The control circuit board 400 may be a printed circuit board on which the timing controller 500, the power supply unit 600, and the memory 700 are mounted. The control circuit board 400 is not limited to that of FIG. 1 and may have control components and various electrical devices mounted thereon.

The timing controller 500 may be attached to one surface of the control circuit board 400. The timing controller 500 may control the driving timing of the display driver 200 by transmitting digital video data to the display driver 200.

The power supply unit 600 (e.g., a circuit) may generate a power voltage and supply the generated power voltage to the display panel 100. Here, the power voltage may include the driving voltage EVDD, the low-potential voltage EVSS, an initialization voltage Vint, a reference voltage Vref, and a bias voltage Vbias, but is not limited thereto.

The memory 700 may store sensing information of pixels. For example, the memory 700 may store threshold voltage information of a transistor, which is received from the display driver 200 and supply the threshold voltage information to the timing controller 500.

Figure 2:
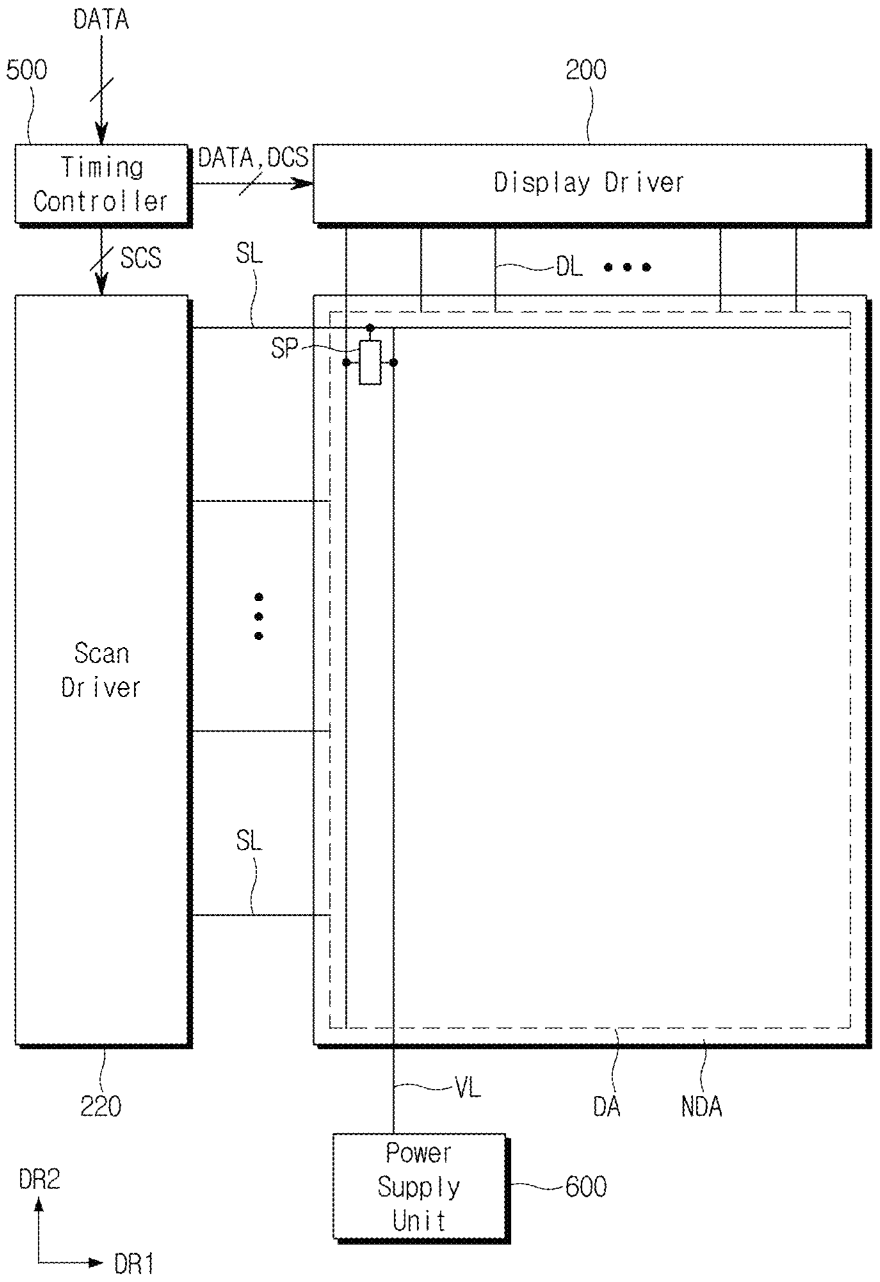
FIG. 2 is a block diagram illustrating the display device according to one embodiment.

FIG. 2 is a block diagram illustrating the display device according to one embodiment.

Referring to FIG. 2, the display panel 100 may include the display area DA and the non-display area NDA. The display area DA may include a plurality of pixels SP, and a power line VL, a scan line SL, and a data line DL that are connected to the pixel SP.

Each of the plurality of pixels SP may be connected to the scan line SL, the data line DL, and the power line VL. Each of the plurality of pixels SP may include a transistor, a light-emitting element, and a capacitor.

The scan lines SL may extend in a first direction DR1 and may be spaced apart from each other in a second direction DR2 intersecting the first direction DR1. The scan lines SL may sequentially supply scan signals to the plurality of pixels SP.

The data lines DL may extend in the second direction DR2 and may be spaced apart from each other in the first direction DR1. The data line DL may supply the data voltage to the pixel SP. The data voltage may determine the luminance of the pixel SP.

The power line VL may extend in the second direction DR2 and may be spaced apart from each other in the first direction DR1. The power line VL may supply a power voltage to the plurality of pixels SP. Here, the power voltage may include a driving voltage EVDD, a low-potential voltage EVSS, an initialization voltage Vint, a reference voltage Vref, and a bias voltage Vbias, but is not limited thereto.

A scan driver 220 may include a plurality of transistors and generate scan signals based on a scan control signal SCS. The scan driver 220 may shift the scan signals using a shift register and sequentially supply the shifted scan signals to scan lines SL. The scan signals of the scan driver 220 may select pixels SP to which the data voltage is supplied, and the selected pixels SP may receive the data voltage through the data lines DL. The scan driver 220 may be disposed on one side or both sides of a non-display area NDA in a gate in panel (GIP) manner.

The timing controller 500 may receive digital video data DATA and a timing signal from a display driving system or a graphic device (not illustrated). The timing controller 500 may generate a data control signal DCS based on the timing signal. The timing controller 500 may control the operation timing of the display driver 200 by supplying the digital video data DATA and the data control signal DCS to the display driver 200. The display driver 200 may convert the digital video data DATA into analog data voltages and supply the analog data voltages to the data lines DL. The timing controller 500 may generate the scan control signal SCS based on the timing signal. The timing controller 500 may control the operation timing of the scan driver 220 by supplying the scan control signal SCS to the scan driver 220. The timing controller 500 may vary a driving frequency of the display panel 100 based on an input frequency received from the display driving system or the graphic device.

The power supply unit 600 may supply a power voltage to the power line VL. The power voltage may include the driving voltage EVDD, the low-potential voltage EVSS, the initialization voltage Vint, the reference voltage Vref, and the bias voltage Vbias, but is not limited thereto. The power supply unit 600 may generate the driving voltage EVDD and supply the driving voltage EVDD to a driving voltage line, generate the initialization voltage Vint and supply the initialization voltage Vint to an initialization voltage line, generate the bias voltage Vbias and supply the bias voltage Vbias to a bias voltage line, generate the reference voltage Vref and supply the reference voltage Vref to a reference voltage line, and generate the low-potential voltage EVSS and supply the low-potential voltage EVSS to a low-potential line.

Figure 3:
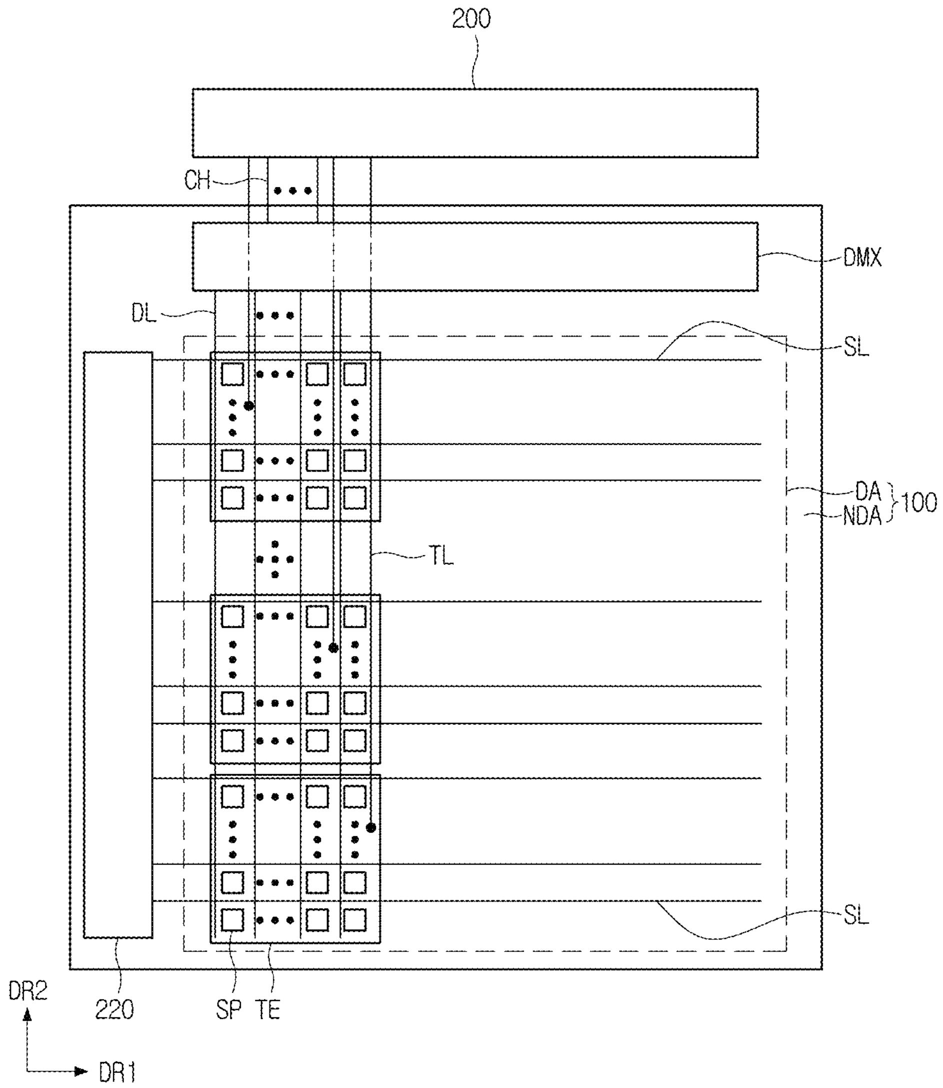
FIG. 3 is a plan view illustrating a display panel of the display device according to one embodiment.
Figure 4:
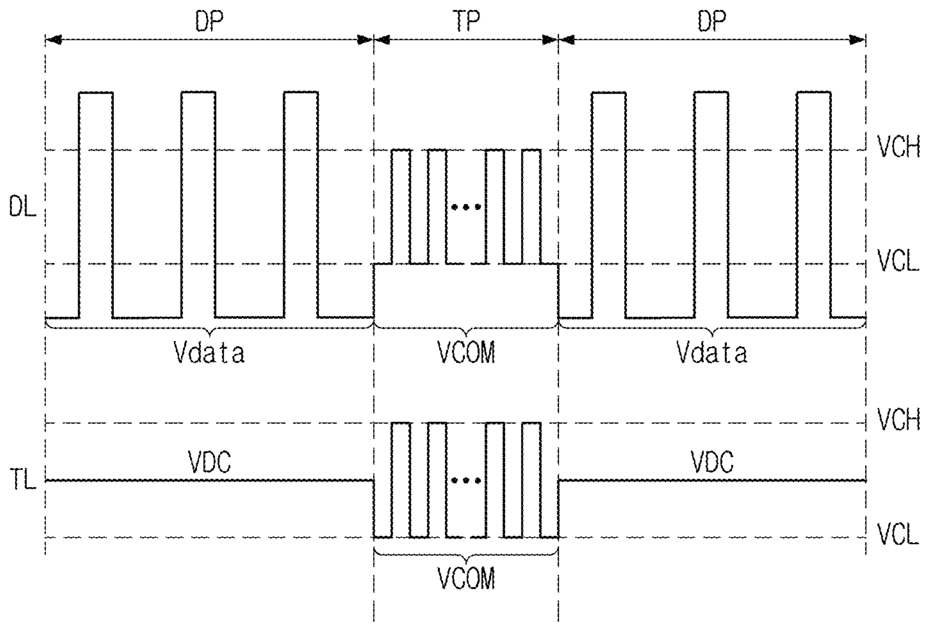
FIG. 4 is a waveform diagram illustrating a driving signal of the display panel in the display device according to one embodiment.

FIG. 3 is a plan view illustrating a display panel of the display device according to one embodiment, and FIG. 4 is a waveform diagram illustrating a driving signal of the display panel in the display device according to one embodiment.

Referring to FIGS. 3 and 4, the display panel 100 may include the display area DA and the non-display area NDA. The display area DA may include the pixels SP and touch electrodes TE. The display area DA may have a display function and a touch sensing function. The display area DA may include the plurality of pixels SP arranged in a matrix form and display an image. The display area DA may include the touch electrodes TE overlapping the pixels SP and sense whether a user touches a screen in a capacitance manner. For example, the touch electrodes TE may sense the user's touch in a self-capacitance manner or a mutual capacitance manner. Hereinafter, the self-capacitance manner will be described as an example.

The pixel SP may be connected to the scan line SL and the data line DL. The pixel SP may receive the scan signal from the scan line SL and the data voltage from the data line DL.

The touch electrode TE may be electrically connected to the display driver 200 through the touch line TL. The touch line TL may extend in the second direction DR2 and may be disposed parallel to the data line DL. The plurality of touch electrodes TE may be formed by dividing a common electrode disposed in the display area DA into a plurality of segments, and each touch electrode TE may be formed to a specific size including the plurality of pixels SP in consideration of a size of a touch point. The touch electrode TE may serve as a common electrode of a plurality of pixels SP overlapping each other and serve as a touch sensor that generates a capacitor when the user's touch occurs.

The display panel 100 may be driven by dividing a display period DP and a touch period TP in a time division manner. One frame may be driven in a time division manner while the display period DP and the touch period TP alternate by a touch synchronization signal. For example, the display panel 100 may be scanned once in a plurality of display periods DP during one frame, and the touch electrode TE may be driven and sensed multiple times in a plurality of touch periods TP.

In the display period DP, the scan driver 220 may supply the scan signal to the pixels SP, and the display driver 200 may supply the data voltage to the pixels SP. The display driver 200 may supply the data voltage Vdata to the data line DL through a demultiplexer DMX in the display period DP and supply a common voltage VDC to the touch electrode TE through the touch line TL.

In the touch period TP, the display driver 200 may supply a touch driving signal VCOM to the touch electrodes TE and read out and sense a change in capacitance from the touch electrodes TE to which the touch driving signal VCOM is applied. Here, in the touch driving signal VCOM, a high common voltage VCH and a low common voltage VCL alternate. The display driver 200 may supply the touch driving signal VCOM to the touch line TL in the touch period TP and supply the touch driving signal VCOM to the data line DL through the demultiplexer DMX. Accordingly, the display panel 100 can minimize parasitic capacitance between the touch electrodes TE and the data lines DL in the touch period TP to minimize or at least reduce resistor capacitor (RC) loads of the touch electrodes TE, thereby improving touch sensing sensitivity. For example, the touch driving signal VCOM may be represented by a common voltage modulation signal or a load free driving (LFD) signal.

The demultiplexer DMX may be disposed on one side of the non-display area NDA. The demultiplexer DMX may be disposed between the display area DA and the display driver 200. The demultiplexer DMX may divide the data voltage Vdata supplied from the display driver 200 through a plurality of output terminals CH in the display period DP in a time division manner and distribute and supply the time-divided data voltage Vdata to a plurality of data lines DL. Accordingly, the number of output terminals CH of the display driver 200 can be reduced compared to the number of data lines DL.

The demultiplexer DMX may supply the touch driving signal VCOM supplied from the display driver 200 through the plurality of output terminals CH to the plurality of data lines DL in the touch period TP.

The demultiplexer DMX may include a 1: n demultiplexer DEMUX circuit that transmits an output of the output terminal CH of the display driver 200 to n data lines DL (n is an integer more than 2). Accordingly, the number of output terminals CH of the display driver 200 can be reduced to 1/n of the number of data lines DL.

The scan driver 220 may be disposed on the other side of the non-display area NDA in which the demultiplexer DMX is not disposed. For example, the scan driver 220 may be disposed on a left or right side of the non-display area NDA or disposed on both the left and right sides to supply the scan signal. The scan driver 220 may be embedded in the display panel 100 in a gate in panel (GIP) type that includes transistors formed in the same process as the transistors of the display area DA.

The scan driver 220 may generate a gate pulse or a scan pulse according to the gate control signal in the display period DP to sequentially and individually drive the scan lines SL. The scan driver 220 may supply a scan signal of a gate-on voltage in one horizontal period of the display period DP and supply a gate-off voltage after one horizontal period.

The display driver 200 may separately drive the data lines DL and the touch lines TL of the display panel 100. For example, the display driver 200 may be provided by integrating a source driver that supplies data signals to the data lines DL and supplies the common voltage VDC to the touch electrodes TE in the display period DP and a touch readout circuit that supplies the touch driving signal VCOM to the data lines DL and the touch electrodes TE in the touch period TP and senses a change in capacitance of each of the touch electrodes TE.

Figure 5:
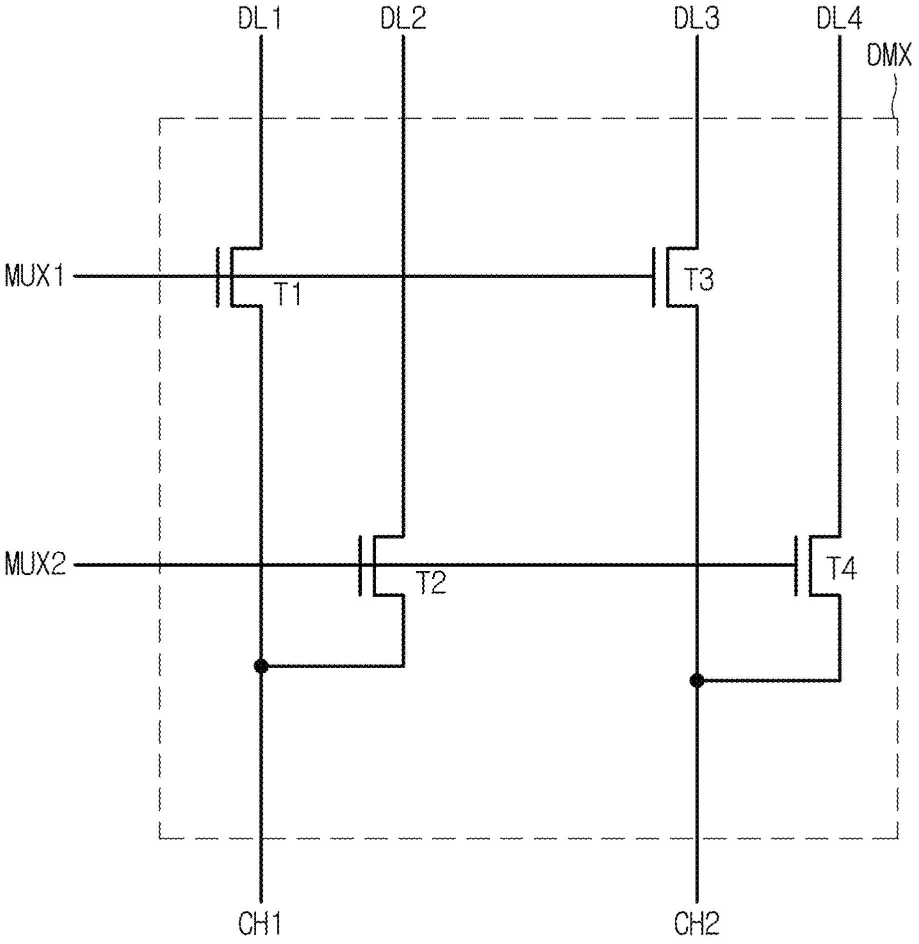
FIG. 5 is a circuit diagram illustrating a demultiplexer of the display device according to one embodiment.
Figure 6:
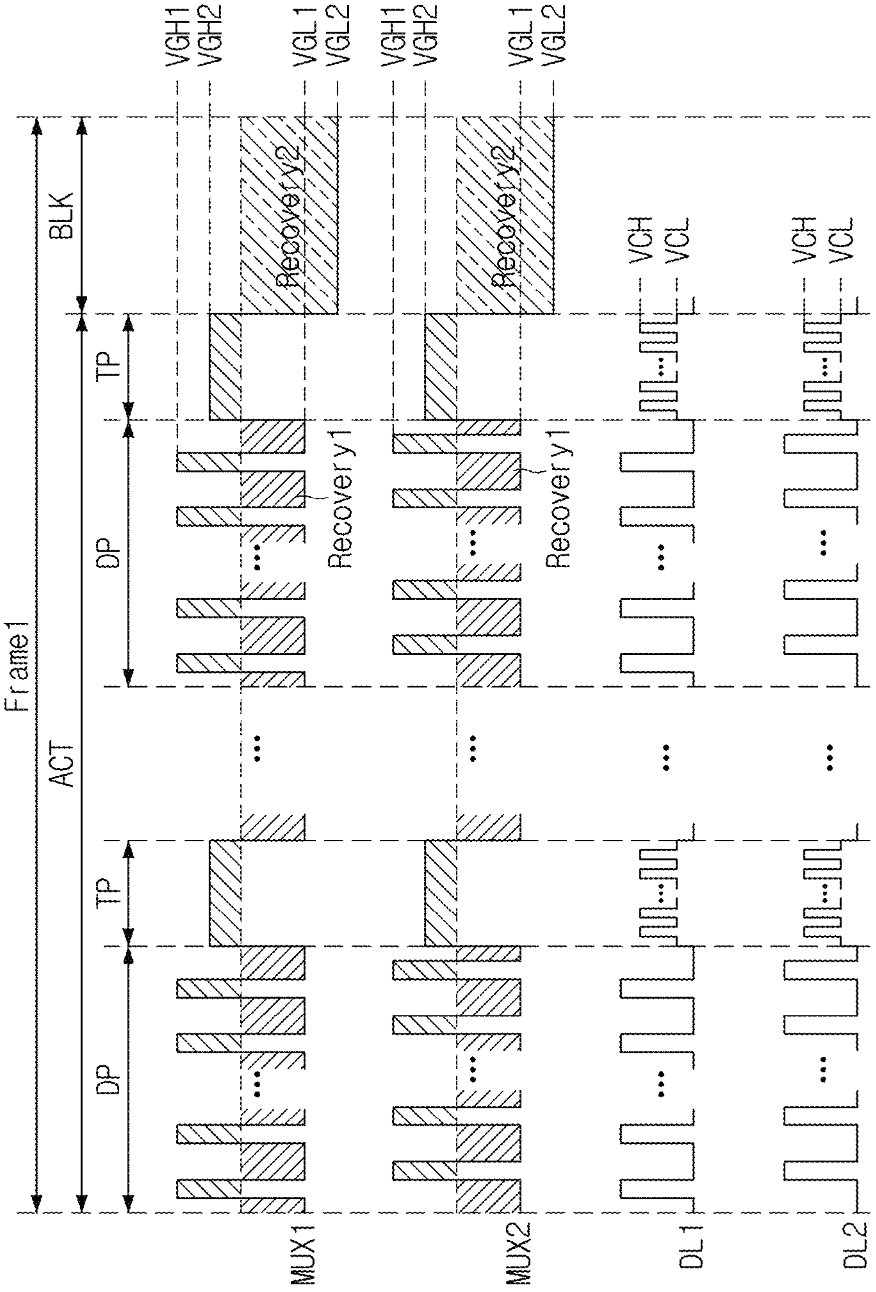
FIG. 6 is a waveform diagram illustrating input/output signals of the demultiplexer in the display device of FIG. 5 according to one embodiment.

FIG. 5 is a circuit diagram illustrating a demultiplexer of the display device according to one embodiment and FIG. 6 is a waveform diagram illustrating input/output signals of the demultiplexer in the display device of FIG. 5 device according to one embodiment.

Referring to FIGS. 5 and 6, the demultiplexer DMX may include a 1: n demultiplexer DEMUX circuit that transmits the output of the output terminal CH of the display driver 200 to n data lines DL (n is an integer more than 2). The number of transistors included in the demultiplexer DMX and the number of data lines DL connected to the demultiplexer DMX are not limited to those illustrated in FIG. 5.

The demultiplexer DMX may include first to fourth transistors T1, T2, T3, and T4. The first and second transistors T1 and T2 may be connected to a first output terminal CH1 of the display driver 200 and may sequentially transmit data voltage Vdata received from the first output terminal CH1 to the first and second data lines DL1 and DL2 in a time division manner. The third and fourth transistors T3 and T4 may be connected to a second output terminal CH2 of the display driver 200 and may sequentially transmit data voltage Vdata received from the second output terminal CH2 to the third and fourth data lines DL3 and DL4 in a time division manner.

The first transistor T1 may be turned on based on a first control signal MUX1 to supply the output signal of the first output terminal CH1 to the first data line DL1. The second transistor T2 may be turned on based on a second control signal MUX2 to supply the output signal of the first output terminal CH1 to the second data line DL2. The third transistor T3 may be turned on based on the first control signal MUX1 to supply the output signal of the second output terminal CH2 to the third data line DL3. The fourth transistor T4 may be turned on based on the second control signal MUX2 to supply the output signal of the second output terminal CH2 to the fourth data line DL4.

The first to fourth transistors T1, T2, T3, and T4 may be configured as n-channel type oxide transistors. The first to fourth transistors T1, T2, T3, and T4 may be turned on based on first and second gate high voltages VGH1 and VGH2 and turned off based on the first and second gate low voltages VGL1 and VGL2. For example, the first gate high voltage VGH1 may be greater than the second gate high voltage VGH2 (VGH1>VGH2), and the first gate low voltage VGL1 may be greater than the second gate low voltage VGL2 (VGL1>VGL2). As another example, the first and second gate high voltages VGH1 and VGH2 may be the same (VGH1=VGH2).

The n-channel type oxide transistor may receive a positive bias temperature stress (PBTS) by a positive driving voltage (Vgs) when turned on by the first or second gate high voltage VGH1 or VGH2 and receive a high drain current stress (HDCS) by a high drain current. The oxide transistor can deteriorate when the positive bias temperature stress (PBTS) and the high drain current stress (HDCS) are accumulated, a threshold voltage (Vth) may shift.

When turned off by the first or second gate low voltage VGL1 or VGL2, the n-channel type oxide transistor may receive a negative bias temperature illumination stress (NBTiS) by the negative driving voltage (Vgs) and cancel out the positive bias temperature stress (PBTS) and the high drain current stress (HDCS), thereby recovering the shift of the threshold voltage (Vth) due to the deterioration of the transistor. Here, it is possible to reduce the deterioration of the n-channel type oxide transistor as the recovery time increases and the gate low voltage decreases.

A first frame Frame1 may include an active period ACT and a blank period BLK. The display driver 200 may supply the data voltage Vdata to the data lines DL in the active period ACT. When the first to fourth transistors T1, T2, T3, and T4 are turned off in the active period ACT, the first to fourth transistors T1, T2, T3, and T4 may perform recovery in a first recovery period Recovery1. The first to fourth transistors T1, T2, T3, and T4 may perform additional recovery in a second recovery period Revocery2 of the blank period BLK.

The active period ACT may include the display period DP and the touch period TP. The first to fourth transistors T1, T2, T3, and T4 may alternately repeat a turn-on period of the first gate high voltage VGH1 and a turn-off period of the first gate low voltage VGL1 in the display period DP. The first to fourth transistors T1, T2, T3, and T4 may be turned on based on the first gate high voltage VGH1 to supply the data voltage Vdata to the first to fourth data lines DL1, DL2, DL3, and DL4, respectively, in the display period DP. The first to fourth transistors T1, T2, T3, and T4 may perform recovery in the first recovery period Recovery1 in which they are turned off by the first gate low voltage VGL1 in the display period DP.

The first to fourth transistors T1, T2, T3, and T4 may be turned on based on the second gate high voltage VGH2 to supply the touch driving signal VCOM to the first to fourth data lines DL1, DL2, DL3, and DL4, respectively, in the touch period TP.

The first to fourth transistors T1, T2, T3, and T4 may perform recovery in the second recovery period Recovery2 in which they are turned off by the second gate low voltage VGL2 in the blank period BLK.

Accordingly, the first to fourth transistors T1, T2, T3, and T4 may cancel out the positive bias temperature stress (PBTS) and the high drain current stress (HDCS), which are applied by the first gate high voltage VGH1 in the turn-on period of the display period DP, by the negative bias temperature illumination stress (NBTiS) applied by the first gate low voltage VGL1 in the first recovery period Recovery1 of the display period DP and additionally cancel out the positive bias temperature stress (PBTS) and the high drain current stress (HDCS) by the negative bias temperature illumination stress (NBTiS) applied by the second gate low voltage VGL2 in the second recovery period Recovery2 of the blank period BLK. Accordingly, the first to fourth transistors T1, T2, T3, and T4 can secure a sufficient recovery time, thereby reducing stress and deterioration.

Figure 7:
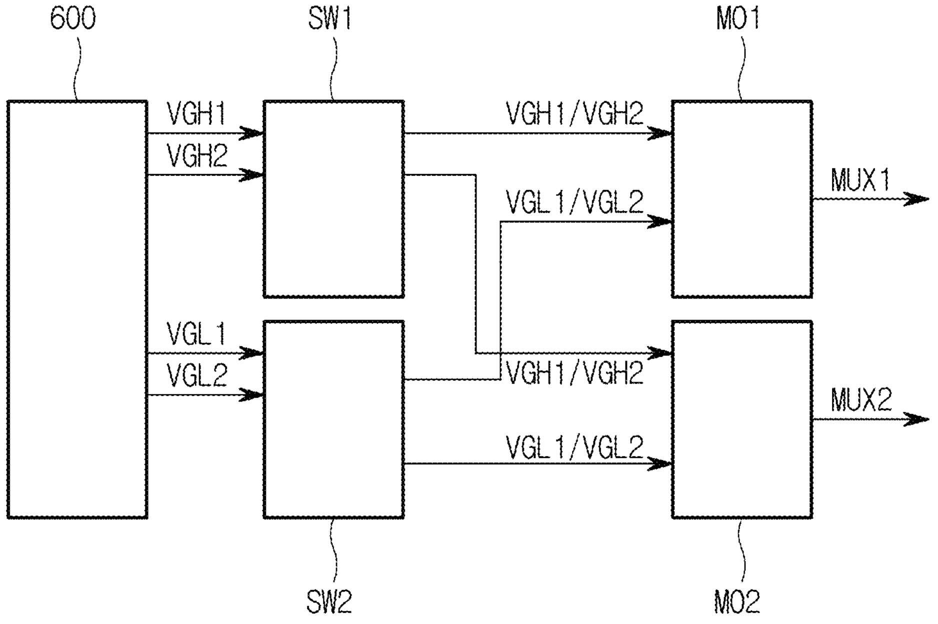
FIG. 7 is a block diagram illustrating an output process of first and second control signals in the display device of FIG. 5 according to one embodiment.

FIG. 7 is a block diagram illustrating an output process of first and second control signals in the display device of FIG. 5 device according to one embodiment.

Referring to FIG. 7, the power supply unit 600 may generate a power voltage and supply the generated power voltage to the display panel 100. The power supply unit 600 may supply the power voltage to first and second control signal output units MO1 and MO2, and the first and second control signal output units MO1 and MO2 may output first and second control signals MUX1 and MUX2.

The power supply unit 600 may supply the first and second gate high voltages VGH1 and VGH2 to a first switching unit SW1 and supply the first and second gate low voltages VGL1 and VGL2 to a second switching unit SW2 (e.g., a circuit). For example, the first gate high voltage VGH1 may be greater than the second gate high voltage VGH2 (VGH1>VGH2), and the first gate low voltage VGL1 may be greater than the second gate low voltage VGL2 (VGL1>VGL2). As another example, the first and second gate high voltages VGH1 and VGH2 may be the same (VGH1=VGH2).

The first switching unit SW1 may supply the first and second gate high voltages VGH1 and VGH2 to the first and second control signal output units MO1 and MO2. The second switching unit SW2 may supply the first and second gate low voltages VGL1 and VGL2 to the first and second control signal output units MO1 and MO2.

Accordingly, the first control signal output unit MO1 (e.g., a circuit) may output the first control signal MUX1 in which the first gate high voltage VGH1 and the first gate low voltage VGL1 alternate in the display period DP of the active period ACT. The first control signal output unit MO1 may output the first control signal MUX1 having the second gate high voltage VGH2 in the touch period TP of the active period ACT. The first control signal output unit MO1 may output the first control signal MUX1 having the second gate low voltage VGL2 in the blank period BLK.

The second control signal output unit MO2 (e.g., a circuit) may output the second control signal MUX2 in which the first gate high voltage VGH1 and the first gate low voltage VGL1 alternate in the display period DP of the active period ACT. The second control signal output unit MO2 may output the second control signal MUX2 having the second gate high voltage VGH2 in the touch period TP of the active period ACT. The second control signal output unit MO2 may output the second control signal MUX2 having the second gate low voltage VGL2 in the blank period BLK.

Figure 8:
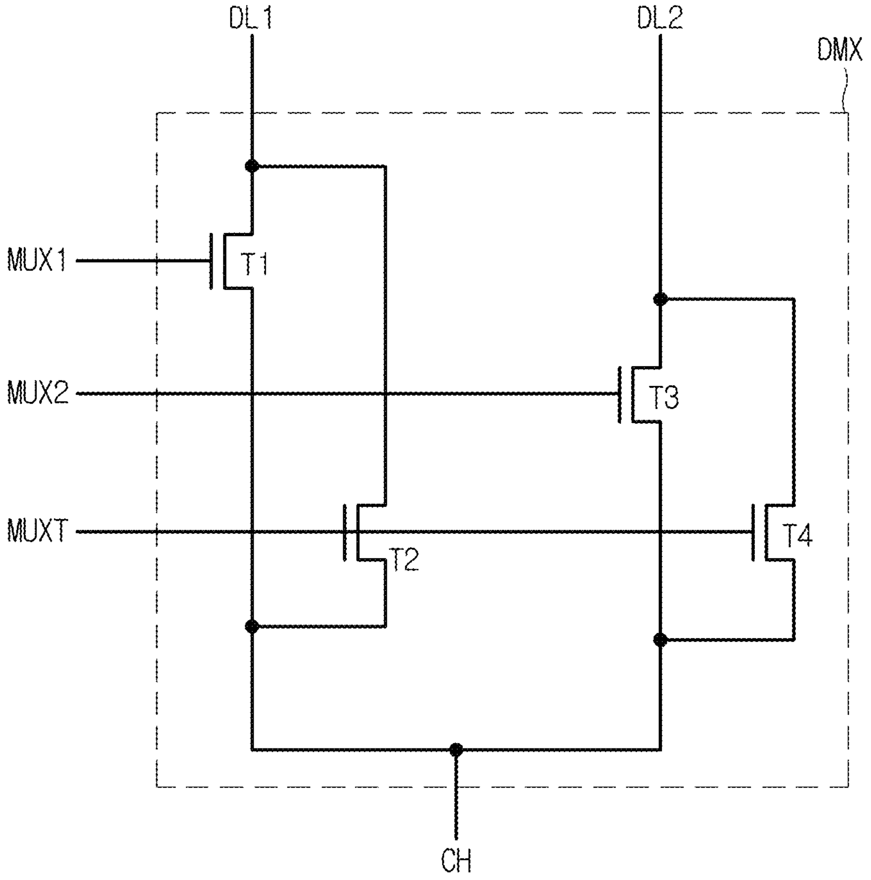
FIG. 8 is a circuit diagram illustrating a demultiplexer of a display device according to another embodiment.
Figure 9:
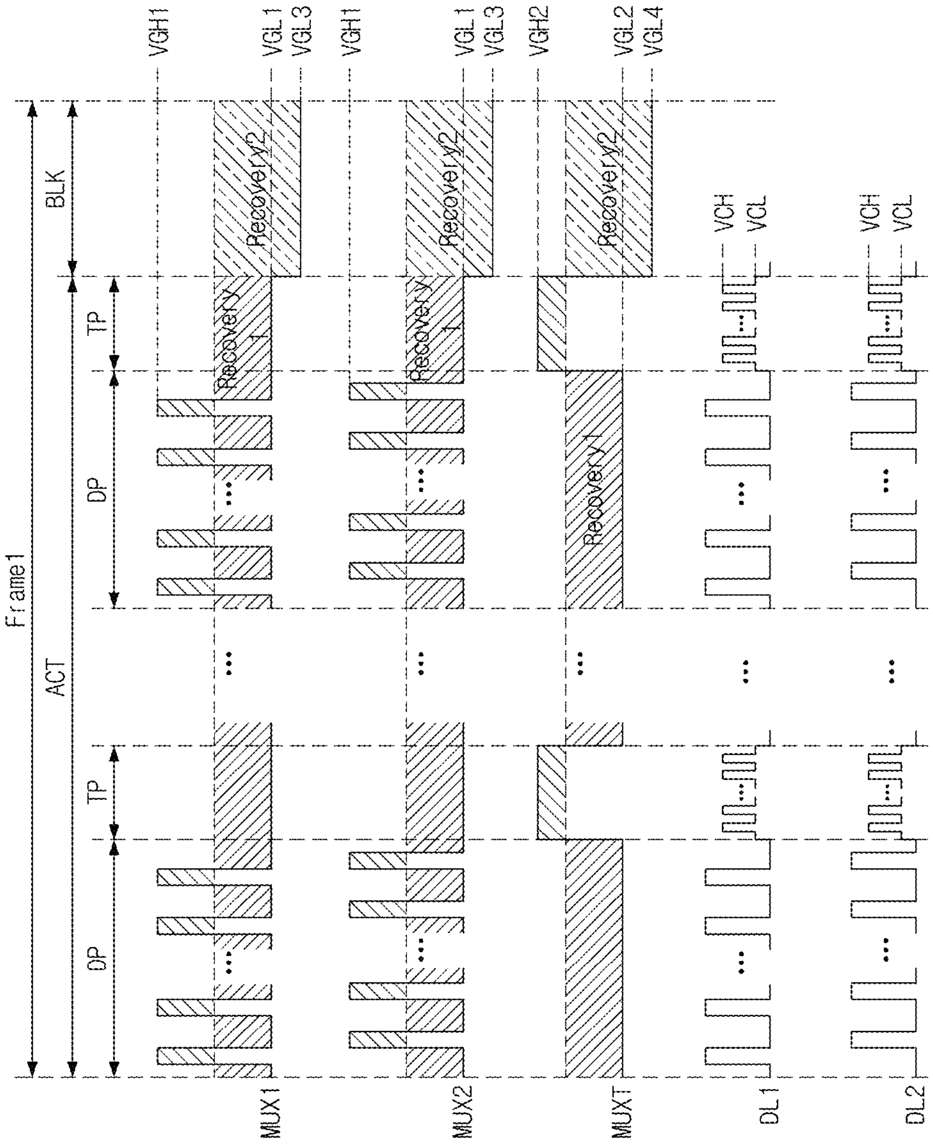
FIG. 9 is an example of the waveform diagram illustrating the input/output signals of the demultiplexer in the display device of FIG. 8 according to one embodiment.

FIG. 8 is a circuit diagram illustrating a demultiplexer of a display device according to another embodiment, and FIG. 9 is an example of the waveform diagram illustrating the input/output signals of the demultiplexer in the display device of FIG. 8 device according to one embodiment.

Referring to FIGS. 8 and 9, the demultiplexer DMX may include the first to fourth transistors T1, T2, T3, and T4.

The first and second transistors T1 and T2 may be connected in parallel between the output terminal CH of the display driver 200 and the first data line DL1. The first and second transistors T1 and T2 may be connected to the output terminal CH of the display driver 200 and may supply the data voltage Vdata received from the output terminal CH to the first data line DL1. The third and fourth transistors T3 and T4 may be connected in parallel between the output terminal CH of the display driver 200 and the second data line DL2. The third and fourth transistors T3 and T4 may be connected to the output terminal CH of the display driver 200 and may supply the data voltage Vdata received from the output terminal CH to the second data line DL2.

The first transistor T1 may be turned on based on the first control signal MUX1 to supply the output signal of the output terminal CH to the first data line DL1. The second transistor T2 may be turned on based on a touch control signal MUXT to supply the output signal of the first output terminal CH to the first data line DL1. The third transistor T3 may be turned on based on the second control signal MUX2 to supply the output signal of the output terminal CH to the second data line DL2. The fourth transistor T4 may be turned on based on the touch control signal MUXT to supply the output signal of the output terminal CH to the second data line DL2.

The first to fourth transistors T1, T2, T3, and T4 may be configured as n-channel type oxide transistors. The first and third transistors T1 and T3 may be turned on based on the first gate high voltage VGH1 and turned off based on the first and third gate low voltages VGL1 and VGL3. The second and fourth transistors T3, and T4 may be turned on based on the second gate high voltages VGH2 and turned off based on the second and fourth gate low voltages VGL2 and VGL4. For example, the first gate high voltage VGH1 may be greater than the second gate high voltage VGH2 (VGH1>VGH2), the first gate low voltage VGL1 may be greater than the third gate low voltage VGL3 (VGL1>VGL3), and the second gate low voltage VGL2 may be greater than the fourth gate low voltage VGL4 (VGL2>VGL4). Here, the first and second gate low voltages VGL1 and VGL2 may be different, and the third and fourth gate low voltages VGL3 and VGL4 may be different.

As another example, the first and second gate high voltages VGH1 and VGH2 may be the same (VGH1=VGH2). As another example, the first and second gate low voltages VGL1 and VGL2 may be the same (VGL1=VGL2), and the third and fourth gate low voltages VGL3 and VGL4 may be the same (VGL3=VGL4).

The n-channel type oxide transistor may receive the positive bias temperature stress (PBTS) by the positive driving voltage (Vgs) when turned on by the first or second gate high voltage VGH1 or VGH2 and receive the high drain current stress (HDCS) by the high drain current. The oxide transistor can deteriorate when the positive bias temperature stress (PBTS) and the high drain current stress (HDCS) are accumulated, a threshold voltage (Vth) may shift.

When turned off by one of the first to fourth gate low voltages VGL1, VGL2, VGL3, and VGL4, the n-channel type oxide transistor may receive the negative bias temperature illumination stress (NBTiS) by the negative driving voltage (Vgs) and cancel out the positive bias temperature stress (PBTS) and the high drain current stress (HDCS), thereby recovering the shift of the threshold voltage (Vth) due to the deterioration of the transistor. Here, it is possible to reduce the deterioration of the n-channel type oxide transistor as the recovery time increases and the gate low voltage decreases.

The first frame Frame1 may include the active period ACT and the blank period BLK. The display driver 200 may supply the data voltage Vdata to the data lines DL in the active period ACT. When the first to fourth transistors T1, T2, T3, and T4 are turned off in the active period ACT, the first to fourth transistors T1, T2, T3, and T4 may perform recovery in the first recovery period Recovery1. The first to fourth transistors T1, T2, T3, and T4 may perform additional recovery in the second recovery period Revocery2 of the blank period BLK.

The active period ACT may include the display period DP and the touch period TP. The first and third transistors T1 and T3 may alternately repeat the turn-on period of the first gate high voltage VGH1 and the turn-off period of the first gate low voltage VGL1 in the display period DP. The first and third transistors T1 and T3 may be turned on based on the first gate high voltage VGH1 to supply the data voltage Vdata to the first and second data lines DL1 and DL2, respectively, in the display period DP. The first and third transistors T1 and T3 may perform recovery in the first recovery period Recovery1 in which they are turned off by the first gate low voltage VGL1 in the display period DP. The second and fourth transistors T2 and T4 may perform recovery in the first recovery period Recovery1 in which they are turned off by the second gate low voltage VGL2 in the display period DP.

The first and third transistors T1 and T3 may perform recovery in the first recovery period Recovery1 in which they are turned off by the first gate low voltage VGL1 in the touch period TP. The second and fourth transistors T2 and T4 may be turned on based on the second gate high voltage VGH2 to supply the touch driving signal VCOM to the first and second data lines DL1, and DL2, respectively, in the touch period TP.

The first and third transistors T1 and T3 may perform recovery in the second recovery period Recovery2 in which they are turned off by the third gate low voltage VGL3 in the blank period BLK. The second and fourth transistors T2 and T4 may perform recovery in the second recovery period Recovery2 in which they are turned off by the fourth gate low voltage VGL4 in the blank period BLK.

Accordingly, the first and third transistors T1 and T3 may cancel out the positive bias temperature stress (PBTS) and the high drain current stress (HDCS), which are applied by the first gate high voltage VGH1 in the turn-on period of the display period DP, by the negative bias temperature illumination stress (NBTiS) applied by the first gate low voltage VGL1 in the first recovery periods Recovery1 of the display period DP and the touch period TP and additionally cancel out the positive bias temperature stress (PBTS) and the high drain current stress (HDCS) by the negative bias temperature illumination stress (NBTiS) applied by the third gate low voltage VGL3 in the second recovery period Recovery2 of the blank period BLK. The second and fourth transistors T2 and T4 may cancel out the positive bias temperature stress (PBTS) and the high drain current stress (HDCS), which are applied by the second gate high voltage VGH2 in the turn-on period of the touch period TP, by the negative bias temperature illumination stress (NBTiS) applied by the second gate low voltage VGL2 in the first recovery period Recovery1 of the display period DP and additionally cancel out the positive bias temperature stress (PBTS) and the high drain current stress (HDCS) the negative bias temperature illumination stress (NBTiS) applied by the fourth gate low voltage VGL4 in the second recovery period Recovery2 of the blank period BLK. Accordingly, the first to fourth transistors T1, T2, T3, and T4 can secure a sufficient recovery time, thereby reducing stress and deterioration.

Figure 10:
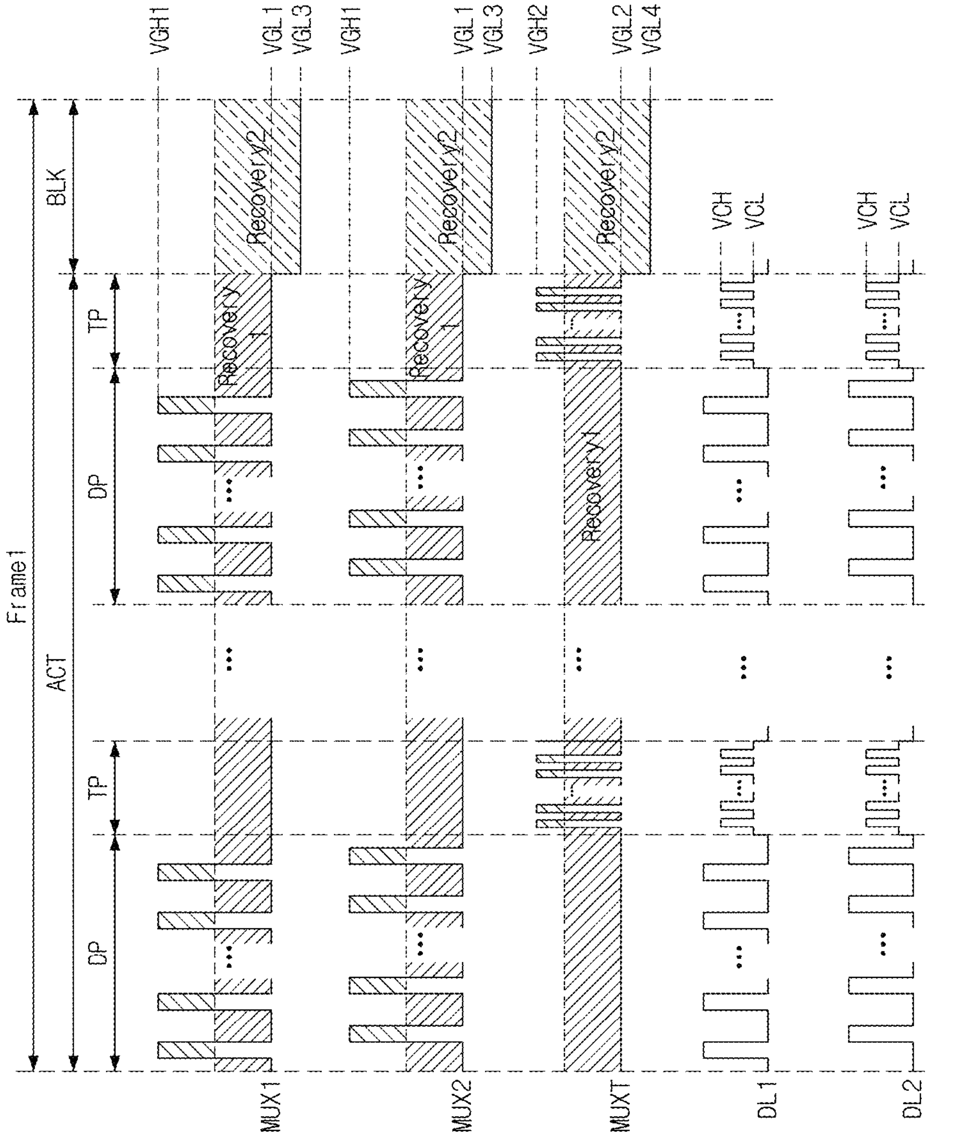
FIG. 10 is another example of the waveform diagram illustrating the input/output signals of the demultiplexer in the display device of FIG. 8 according to one embodiment.

FIG. 10 is another example of the waveform diagram illustrating the input/output signals of the demultiplexer in the display device of FIG. 8. The display device of FIG. 10 has a different configuration of the touch control signal MUXT from the display device of FIG. 9, and the same configuration as the above configuration will be briefly described or omitted.

Referring to FIG. 10, the active period ACT may include the display period DP and the touch period TP. The first and third transistors T1 and T3 may alternately repeat the turn-on period of the first gate high voltage VGH1 and the turn-off period of the first gate low voltage VGL1 in the display period DP. The first and third transistors T1 and T3 may be turned on based on the first gate high voltage VGH1 in the display period DP to supply the data voltage Vdata to the first and second data lines DL1 and DL2, respectively. The first and third transistors T1 and T3 may perform recovery in the first recovery period Recovery1 in which they are turned off by the first gate low voltage VGL1 in the display period DP. The second and fourth transistors T2 and T4 may perform recovery in the first recovery period Recovery1 in which they are turned off by the second gate low voltage VGL2 in the display period DP.

The first and third transistors T1 and T3 may perform recovery in the first recovery period Recovery1 in which they are turned off by the first gate low voltage VGL1 in the touch period TP. The second and fourth transistors T2 and T4 may alternately repeat the turn-on period of the second gate high voltage VGH2 and the turn-off period of the second gate low voltage VGL2 in the touch period TP. Here, a high pulse width and low pulse width of the touch control signal MUXT in the touch period TP may be the same. The second and fourth transistors T2 and T4 may be turned on based on the second gate high voltage VGH2 to supply the touch driving signal VCOM to the first and second data lines DL1, and DL2, respectively, in the touch period TP.

The first and third transistors T1 and T3 may perform recovery in the second recovery period Recovery2 in which they are turned off by the third gate low voltage VGL3 in the blank period BLK. The second and fourth transistors T2 and T4 may perform recovery in the second recovery period Recovery2 in which they are turned off by the fourth gate low voltage VGL4 in the blank period BLK. Accordingly, the first to fourth transistors T1, T2, T3, and T4 can secure a sufficient recovery time, thereby reducing stress and deterioration.

Figure 11:
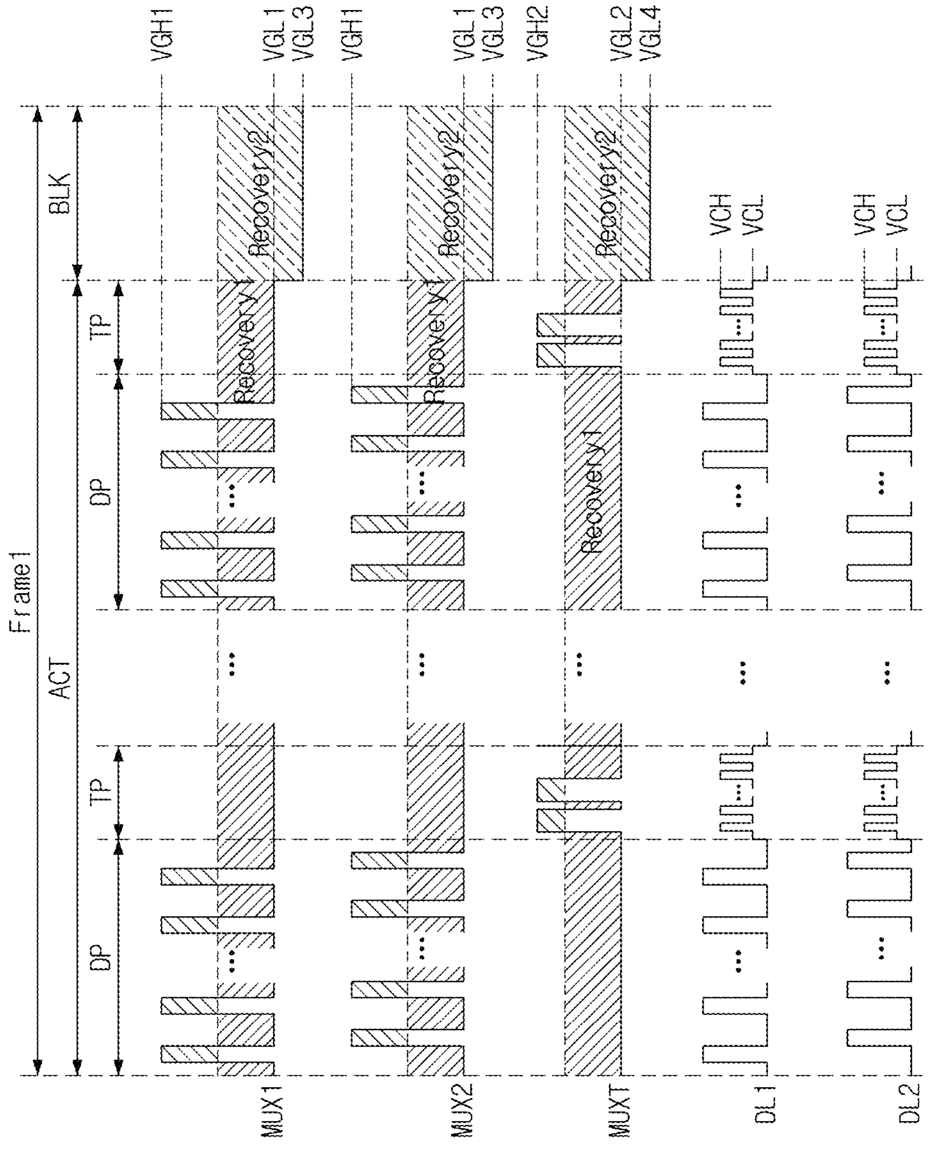
FIG. 11 is still another example of the waveform diagram illustrating the input/output signals of the demultiplexer in the display device of FIG. 8 according to one embodiment.

FIG. 11 is still another example of the waveform diagram illustrating the input/output signals of the demultiplexer in the display device of FIG. 8. The display device of FIG. 11 has a different configuration of the touch control signal MUXT from the display device of FIG. 9, and the same configuration as the above configuration will be briefly described or omitted.

Referring to FIG. 11, the active period ACT may include the display period DP and the touch period TP. The first and third transistors T1 and T3 may alternately repeat the turn-on period of the first gate high voltage VGH1 and the turn-off period of the first gate low voltage VGL1 in the display period DP. The first and third transistors T1 and T3 may be turned on based on the first gate high voltage VGH1 to supply the data voltage Vdata to the first and second data lines DL1 and DL2, respectively, in the display period DP. The first and third transistors T1 and T3 may perform recovery in the first recovery period Recovery1 in which they are turned off by the first gate low voltage VGL1 in the display period DP. The second and fourth transistors T2 and T4 may perform recovery in the first recovery period Recovery1 in which they are turned off by the second gate low voltage VGL2 in the display period DP.

The first and third transistors T1 and T3 may perform recovery in the first recovery period Recovery1 in which they are turned off by the first gate low voltage VGL1 in the touch period TP. The second and fourth transistors T2 and T4 may alternately repeat the turn-on period of the second gate high voltage VGH2 and the turn-off period of the second gate low voltage VGL2 in the touch period TP. Here, the high pulse width of the touch control signal MUXT in the touch period TP may be twice or more the low pulse width. The second and fourth transistors T2 and T4 may be turned on based on the second gate high voltage VGH2 to supply the touch driving signal VCOM to the first and second data lines DL1, and DL2, respectively, in the touch period TP.

The first and third transistors T1 and T3 may perform recovery in the second recovery period Recovery2 in which they are turned off by the third gate low voltage VGL3 in the blank period BLK. The second and fourth transistors T2 and T4 may perform recovery in the second recovery period Recovery2 in which they are turned off by the fourth gate low voltage VGL4 in the blank period BLK. Accordingly, the first to fourth transistors T1, T2, T3, and T4 can secure a sufficient recovery time, thereby reducing stress and deterioration.

Figure 12:
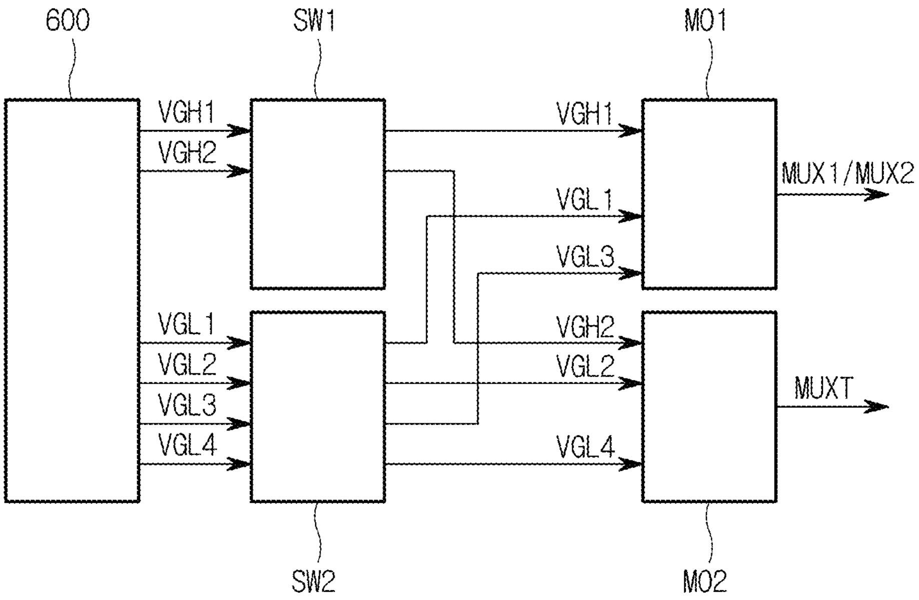
FIG. 12 is a block diagram illustrating an output process of the first and second control signals and a touch control signal in the display device of FIG. 8 according to one embodiment.

FIG. 12 is a block diagram illustrating an output process of the first and second control signals and a touch control signal in the display device of FIG. 8 device according to one embodiment.

Referring to FIG. 12, the power supply unit 600 may generate a power voltage and supply the generated power voltage to the display panel 100. The power supply unit 600 may supply the power voltage to the first and second control signal output units MO1 and MO2. The first control signal output unit MO1 may output the first and second control signals MUX1 and MUX2, and the second control signal output unit MO2 may output the touch control signal MUXT.

The power supply unit 600 may supply the first and second gate high voltages VGH1 and VGH2 to a first switching unit SW1 (e.g., a circuit) and supply the first to fourth gate low voltages VGL1, VGL2, VGL3, and VGL4 to the second switching unit SW2.

For example, the first gate high voltage VGH1 may be greater than the second gate high voltage VGH2 (VGH1>VGH2), the first gate low voltage VGL1 may be greater than the third gate low voltage VGL3 (VGL1>VGL3), and the second gate low voltage VGL2 may be greater than the fourth gate low voltage VGL4 (VGL2>VGL4). Here, the first and second gate low voltages VGL1 and VGL2 may be different, and the third and fourth gate low voltages VGL3 and VGL4 may be different.

As another example, the first and second gate high voltages VGH1 and VGH2 may be the same (VGH1=VGH2). As another example, the first and second gate low voltages VGL1 and VGL2 may be the same (VGL1=VGL2), and the third and fourth gate low voltages VGL3 and VGL4 may be the same (VGL3=VGL4).

The first switching unit SW1 may supply the first gate high voltage VGH1 to the first control signal output unit MO1 and supply the second gate high voltage VGH2 to the second control signal output unit MO2. The second switching unit SW2 may supply the first and third gate low voltages VGL1 and VGL3 to the first control signal output unit MO1. The second switching unit SW2 may supply the second and fourth gate low voltages VGL2 and VGL4 to the second control signal output unit MO2.

Referring to FIGS. 9 to 11, the first control signal output unit MO1 may output the first and second control signal MUX1 and MUX2 in which the first gate high voltage VGH1 and the first gate low voltage VGL1 alternate in the display period DP of the active period ACT. The first control signal output unit MO1 may output the first and second control signals MUX1 and MUX2 having the first gate high voltage VGL1 in the touch period TP of the active period ACT. The first control signal output unit MO1 may output the first and second control signals MUX1 and MUX2 having the third gate low voltage VGL3 in the blank period BLK.

Referring to FIG. 9, the second control signal output unit MO2 may output the touch control signal MUXT having the second gate low voltage VGL2 in the display period DP of the active period ACT. The second control signal output unit MO2 may output the touch control signal MUXT having the second gate high voltage VGH2 in the touch period TP of the active period ACT. The second control signal output unit MO2 may output the touch control signal MUXT having the fourth gate low voltage VGL4 in the blank period BLK.

Referring to FIGS. 10 and 11, the second control signal output unit MO2 may output the touch control signal MUXT in which the second gate high voltage VGH2 and the second gate low voltage VGL2 alternate in the touch period TP of the active period ACT.

Figure 13:
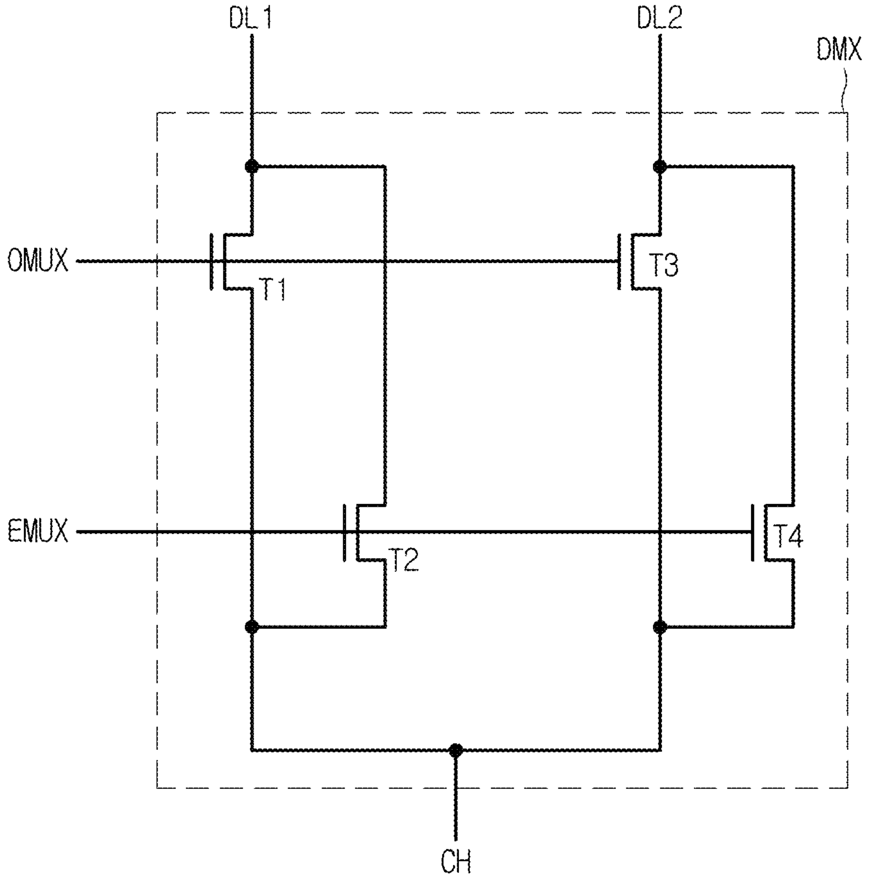
FIG. 13 is a circuit diagram illustrating a demultiplexer of a display device according to still another embodiment.
Figure 14:
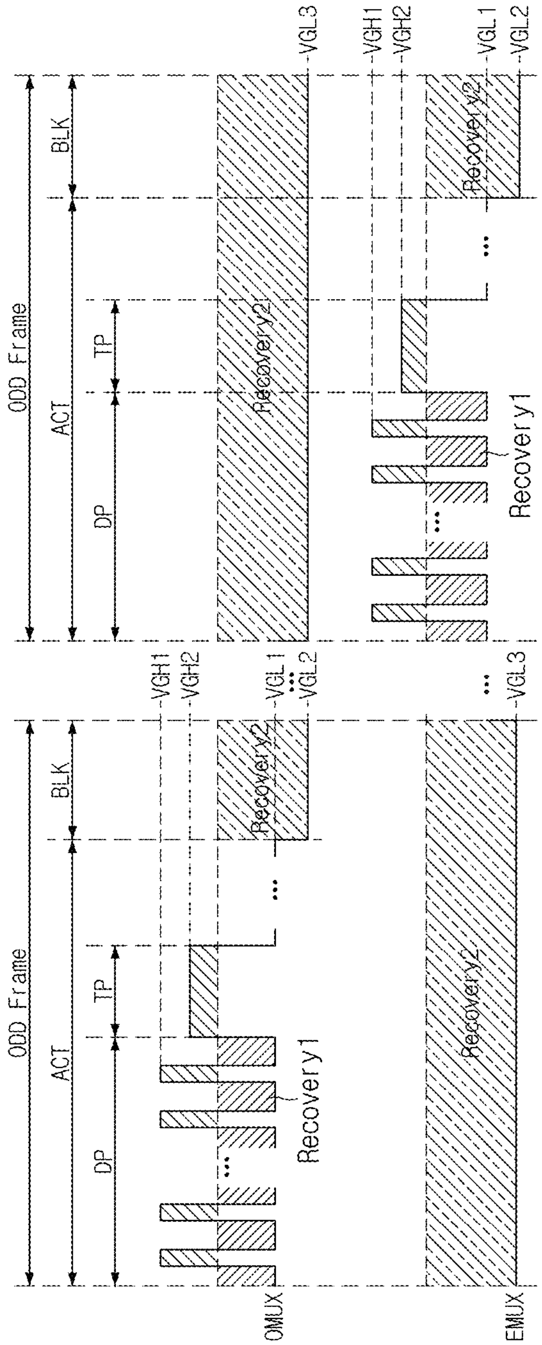
FIG. 14 is a waveform diagram illustrating input/output signals of the demultiplexer in the display device of FIG. 13 according to one embodiment.

FIG. 13 is a circuit diagram illustrating a demultiplexer of a display device according to still another embodiment, and FIG. 14 is a waveform diagram illustrating input/output signals of the demultiplexer in the display device of FIG. 13 device according to one embodiment.

Referring to FIGS. 13 and 14, the demultiplexer DMX may include the first to fourth transistors T1, T2, T3, and T4.

The first and second transistors T1 and T2 may be connected in parallel between the output terminal CH of the display driver 200 and the first data line DL1. The first and second transistors T1 and T2 may be connected to the output terminal CH of the display driver 200 and may supply the data voltage Vdata received from the output terminal CH to the first data line DL1. The third and fourth transistors T3 and T4 may be connected in parallel between the output terminal CH of the display driver 200 and the second data line DL2. The third and fourth transistors T3 and T4 may be connected to the output terminal CH of the display driver 200 and may supply the data voltage Vdata received from the output terminal CH to the second data line DL2.

The first transistor T1 may be turned on based on an odd control signal OMUX to supply the output signal of the output terminal CH to the first data line DL1. The second transistor T2 may be turned on based on an even control signal EMUX to supply the output signal of the output terminal CH to the first data line DL1. The third transistor T3 may be turned on based on the odd control signal OMUX to supply the output signal of the output terminal CH to the second data line DL2. The fourth transistor T4 may be turned on based on the even control signal EMUX to supply the output signal of the output terminal CH to the second data line DL2.

The first to fourth transistors T1, T2, T3, and T4 may be configured as n-channel type oxide transistors. The first to fourth transistors T1, T2, T3, and T4 may be turned on based on the first and second gate high voltages VGH1 and VGH2 and turned off based on the first to third gate low voltages VGL1, VGL2, and VGL3. For example, the first gate high voltage VGH1 may be greater than the second gate high voltage VGH2 (VGH1>VGH2), and the first gate low voltage VGL1 may be greater than the second or third gate low voltage VGL2 or VGL3 (VGL1>VGL2 or VGL1>VGL3). The second and third gate low voltages VGL2 and VGL3 may be different.

As another example, the first and second gate high voltages VGH1 and VGH2 may be the same (VGH1=VGH2). As still another example, the second and third gate high voltages VGL2 and VGL3 may be the same (VGL2=VGL3).

The n-channel type oxide transistor may receive the positive bias temperature stress (PBTS) by the positive driving voltage (Vgs) when turned on by the first or second gate high voltage VGH1 or VGH2 and receive the high drain current stress (HDCS) by the high drain current. The oxide transistor can deteriorate when the positive bias temperature stress (PBTS) and the high drain current stress (HDCS) are accumulated, a threshold voltage (Vth) may shift.

When turned off by one of the first to third gate low voltages VGL1, VGL2, and VGL3, the n-channel type oxide transistor may receive the negative bias temperature illumination stress (NBTiS) by the negative driving voltage (Vgs) and cancel out the positive bias temperature stress (PBTS) and the high drain current stress (HDCS), thereby recovering the shift of the threshold voltage (Vth) due to the deterioration of the transistor. Here, it is possible to reduce the deterioration of the n-channel type oxide transistor as the recovery time increases and the gate low voltage decreases.

An odd frame ODD Frame may include the active period ACT and the blank period BLK. The odd frame ODD Frame may be an odd frame among a plurality of frames. When the first and third transistors T1 and T3 are turned off in the active period ACT of the odd frame ODD Frame, the first and third transistors T1 and T3 may perform recovery in the first recovery period Recovery1. The first and third transistors T1 and T3 may perform additional recovery in the second recovery period Revocery2 of the blank period BLK in the odd frame ODD Frame. The first and third transistors T1 and T3 may perform additional recovery of the second recovery period Revocery2 in the active period ACT and the blank period BLK of an even frame EVEN Frame.

The even frame EVEN Frame may include the active period ACT and the blank period BLK. The even frame EVEN Frame may be an even frame among the plurality of frames. When the second and fourth transistors T2 and T4 are turned off in the active period ACT of the even frame EVEN Frame, the second and fourth transistors T2 and T4 may perform recovery in the first recovery period Recovery1. The second and fourth transistors T2 and T4 may perform additional recovery in the second recovery period Revocery2 of the blank period BLK in the even frame EVEN Frame. The second and fourth transistors T2 and T4 may perform additional recovery in the second recovery periods Revocery2 of the active period ACT and the blank period BLK of the odd frame ODD Frame.

The active period ACT in the odd frame ODD Frame may include the display period DP and the touch period TP. The first and third transistors T1 and T3 may alternately repeat the turn-on period of the first gate high voltage VGH1 and the turn-off period of the first gate low voltage VGL1 in the display period DP of the odd frame ODD Frame. The first and third transistors T1 and T3 may be turned on based on the first gate high voltage VGH1 to supply the data voltage Vdata to the first and second data lines DL1 and DL2, respectively, in the display period DP of the odd frame ODD Frame. The first and third transistors T1 and T3 may perform recovery in the first recovery period Recovery1 in which they are turned off by the first gate low voltage VGL1 in the display period DP of the odd frame ODD Frame.

The first and third transistors T1 and T3 may be turned on based on the second gate high voltage VGH2 to supply the touch driving signal VCOM to the first and second data lines DL1 and DL2, respectively, in the touch period TP of the odd frame ODD Frame.

The first and third transistors T1 and T3 may perform recovery in the second recovery period Recovery2 in which they are turned off by the second gate low voltage VGL2 in the blank period BLK of the odd frame ODD Frame. The first and third transistors T1 and T3 may perform recovery in the second recovery period Recovery2 in which they are turned off by the third gate low voltage VGL3 in the display period ACT and the blank period BLK of the even frame EVEN Frame.

The active period ACT in the even frame EVEN Frame may include the display period DP and the touch period TP. The second and fourth transistors T2 and T4 may alternately repeat the turn-on period of the first gate high voltage VGH1 and the turn-off period of the first gate low voltage VGL1 in the display period DP of the even frame EVEN Frame. The second and fourth transistors T2 and T4 may be turned on based on the first gate high voltage VGH1 to supply the data voltage Vdata to the first and second data lines DL1 and DL2, respectively. in the display period DP of the even frame EVEN Frame. The second and fourth transistors T2 and T4 may perform recovery in the first recovery period Recovery1 in which they are turned off by the first gate low voltage VGL1 in the display period DP of the even frame EVEN Frame.

The second and fourth transistors T2 and T4 may be turned on based on the second gate high voltage VGH2 to supply the touch driving signal VCOM to the first and second data lines DL1 and DL2, respectively, in the touch period TP of the even frame EVEN Frame.

The second and fourth transistors T2 and T4 may perform recovery in the second recovery period Recovery2 in which they are turned off by the second gate low voltage VGL2 in the blank period BLK of the even frame EVEN Frame. The second and fourth transistors T2 and T4 may perform recovery in the second recovery period Recovery2 in which they are turned off by the third gate low voltage VGL3 in the display period ACT and the blank period BLK of the odd frame ODD Frame.

Accordingly, the first and third transistors T1 and T3 may cancel out the positive bias temperature stress (PBTS) and the high drain current stress (HDCS), which are applied by the first and second gate high voltages VGH1 and VGH2 in the turn-on periods of the display period DP and the touch period TP in the odd frame ODD Frame, by the negative bias temperature illumination stress (NBTiS) applied by the first gate low voltage VGL1 in the first recovery period Recovery1 of the display period DP. The first and third transistors T1 and T3 may additionally cancel out the negative bias temperature illumination stress (NBTiS) applied by the second gate low voltage VGL2 in the second recovery period Recovery2 of the blank period BLK in the odd frame ODD Frame. The first and third transistors T1 and T3 may additionally cancel out the negative bias temperature illumination stress (NBTiS) in the second recovery period Recovery2 by the third gate low voltage VGL3 in the active period ACT and the blank period BLK of the even frame EVEN Frame.

The second and fourth transistors T2 and T4 may cancel out the positive bias temperature stress (PBTS) and the high drain current stress (HDCS), which are applied by the first and second gate high voltages VGH1 and VGH2 in the turn-on periods of the display period DP and the touch period TP in the even frame EVEN Frame, by the negative bias temperature illumination stress (NBTiS) applied by the first gate low voltage VGL1 in the first recovery period Recovery1 of the display period DP. The second and fourth transistors T2 and T4 may additionally cancel out the negative bias temperature illumination stress (NBTiS) applied by the second gate low voltage VGL2 in the second recovery period Recovery2 of the blank period BLK in the even frame EVEN Frame. The second and fourth transistors T2 and T4 may additionally cancel out the negative bias temperature illumination stress (NBTiS) in the second recovery period Recovery2 by the third gate low voltage VGL3 in the active period ACT and the blank period BLK of the odd frame ODD Frame.

Accordingly, the first to fourth transistors T1, T2, T3, and T4 can secure a sufficient recovery time, thereby reducing stress and deterioration.

Figure 15:
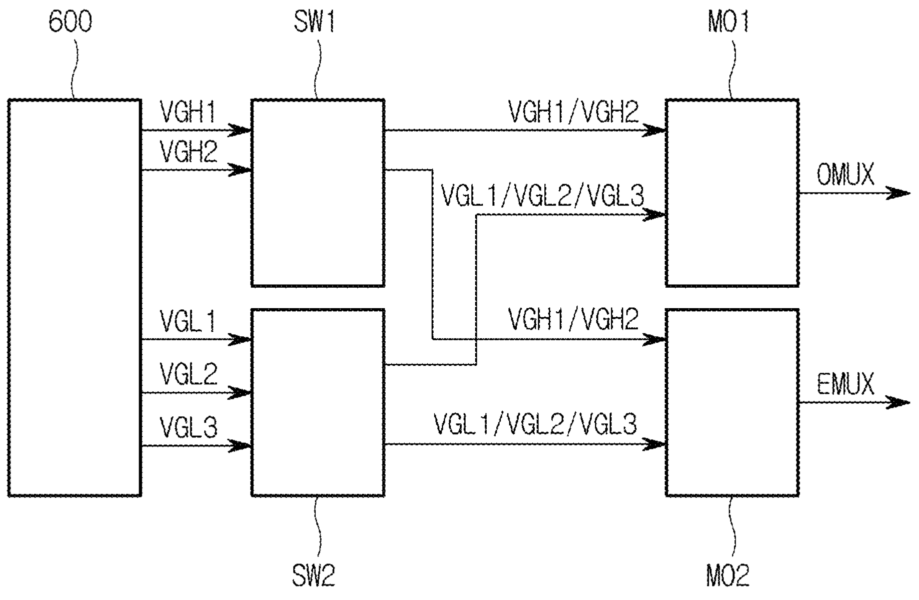
FIG. 15 is a block diagram illustrating an output process of an odd control signal and an even control signal in the display device of FIG. 13 according to one embodiment.

FIG. 15 is a block diagram illustrating an output process of an odd control signal and an even control signal in the display device of FIG. 13 device according to one embodiment.

Referring to FIG. 15, the power supply unit 600 may generate a power voltage and supply the generated power voltage to the display panel 100. The power supply unit 600 may supply the power voltage to the first and second control signal output units MO1 and MO2, and the first and second control signal output units MO1 and MO2 may output the odd control signal OMUX and the even control signal EMUX.

The power supply unit 600 may supply the first and second gate high voltages VGH1 and VGH2 to the first switching unit SW1 and supply the first to third gate low voltages VGL1, VGL2, and VGL3 to the second switching unit SW2. For example, the first gate high voltage VGH1 may be greater than the second gate high voltage VGH2 (VGH1>VGH2), and the first gate low voltage VGL1 may be greater than the second or third gate low voltage VGL2 or VGL3 (VGL1>VGL2 or VGL1>VGL3). The second and third gate low voltages VGL2 and VGL3 may be different.

As another example, the first and second gate high voltages VGH1 and VGH2 may be the same (VGH1=VGH2). As still another example, the second and third gate high voltages VGL2 and VGL3 may be the same (VGL2=VGL3).

The first switching unit SW1 may supply the first and second gate high voltages VGH1 and VGH2 to the first and second control signal output units MO1 and MO2. The second switching unit SW2 may supply the first to third gate low voltages VGL1, VGL2, and VGL3 to the first and second control signal output units MO1 and MO2.

Accordingly, the first control signal output unit MO1 may output the odd control signal OMUX in which the first gate high voltage VGH1 and the first gate low voltage VGL1 alternate in the display period DP of the odd frame ODD Frame. The first control signal output unit MO1 may output the odd control signal OMUX having the second gate high voltage VGH2 in the touch period TP of the odd frame ODD Frame. The first control signal output unit MO1 may output the odd control signal OMUX having the second gate low voltage VGL2 in the blank period BLK of the odd frame ODD Frame. The first control signal output unit MO1 may output the odd control signal OMUX having the first gate low voltage VGL3 in the active period ACT and the blank period BLK of the even frame EVEN Frame.

The second control signal output unit MO2 may output the even control signal EMUX in which the first gate high voltage VGH1 and the first gate low voltage VGL1 alternate in the display period DP of the even frame EVEN Frame. The second control signal output unit MO2 may output the even control signal EMUX having the second gate high voltage VGH2 in the touch period TP of the even frame EVEN Frame. The second control signal output unit MO2 may output the even control signal EMUX having the second gate low voltage VGL2 in the blank period BLK of the even frame EVEN Frame. The second control signal output unit MO2 may output the even control signal EMUX having the third gate low voltage VGL3 in the active period ACT and the blank period BLK of the odd frame ODD Frame.

The display device 10 according to various embodiments of the present specification may be described as follows.

According to various embodiments of the present specification, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between a first output terminal of the display driver and data lines of the display panel, in which the demultiplexer includes a first transistor electrically connecting the first output terminal to a first data line among the data lines based on a first control signal, and a second transistor electrically connecting the first output terminal to a second data line among the data lines based on a second control signal, in which each of the first and second control signals alternately has a first gate high voltage and a first gate low voltage in the display period and has a second gate low voltage that is smaller than the first gate low voltage in a blank period after the active period.

In the display device according to various embodiments of the present specification, each of the first and second control signals may have a second gate high voltage that is smaller than the first gate high voltage in the touch period.

The display device according to various embodiments of the present specification may further include a first control signal output unit that outputs the first control signal, a second control signal output unit that outputs the second control signal, a first switching unit that supplies the first and second gate high voltages to each of the first and second control signal output units, a second switching unit that supplies the first and second gate low voltages to each of the first and second control signal output units, and a power supply unit that supplies the first and second gate high voltages to the first switching unit and the first and second gate low voltages to the second switching unit.

In the display device according to various embodiments of the present specification, each of the first and second control signals may have a second gate high voltage that is equal to the first gate high voltage in the touch period.

In the display device according to various embodiments of the present specification, the first and second transistors may supply a data voltage to the first and second data lines, respectively, in the display period and supply a touch driving signal to the first and second data lines, respectively, in the touch period.

In the display device according to various embodiments of the present specification, the demultiplexer may further include a third transistor electrically connecting a second output terminal of the display driver to a third data line among the data lines based on the first control signal, and a fourth transistor electrically connecting the second output terminal to a fourth data line among the data lines based on the second control signal.

According to various embodiments of the present specification, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between a first output terminal of the display driver and data lines of the display panel, in which the demultiplexer includes a first transistor electrically connecting the output terminal to a first data line among the data lines based on a first control signal, and a second transistor electrically connecting the output terminal to the first data line among the data lines based on a touch control signal, in which the first control signal alternately has a first gate high voltage and a first gate low voltage in the display period, has the first gate low voltage in the touch period, and has a second gate low voltage that is smaller than the first gate low voltage in a blank period after the active period.

In the display device according to various embodiments of the present specification, the touch control signal may have a third gate low voltage in the display period, a second gate high voltage in the touch period, and a fourth gate low voltage that is smaller than the third gate low voltage in the blank period.

The display device according to various embodiments of the present specification may further include a first control signal output unit that outputs the first control signal, a second control signal output unit that outputs the touch control signal, a first switching unit that supplies the first gate high voltage to the first control signal output unit and supplies the second gate high voltage to the second control signal output unit, a second switching unit that supplies the first gate low voltage and second gate low voltage to the first control signal output unit and supplies the third gate low voltage and the fourth gate low voltage to the second control signal output unit, and a power supply unit that supplies the first and second gate high voltages to the first switching unit and supplies the first to fourth gate low voltages to the second switching unit.

In the display device according to various embodiments of the present specification, the second gate high voltage may be smaller than the first gate high voltage, the first gate low voltage and the third gate low voltage may be different, and the second gate low voltage and the fourth gate low voltage may be different.

In the display device according to various embodiments of the present specification, the first and second gate high voltages may be the same, the first gate low voltage and the third gate low voltage may be the same, and the second gate low voltage and the fourth gate low voltage may be the same.

In the display device according to various embodiments of the present specification, the touch control signal may have a third gate low voltage in the display period, alternately have a second gate high voltage and the third gate low voltage in the touch period, and have a fourth gate low voltage that is smaller than the third gate low voltage in the blank period.

In the display device according to various embodiments of the present specification, a high pulse width of the touch control signal in the touch period may be twice or more a low pulse width of the touch control signal.

In the display device according to various embodiments of the present specification, the demultiplexer may further include a third transistor electrically connecting the output terminal to a second data line among the data lines based on the second control signal, and a fourth transistor electrically connecting the output terminal to the second data line based on the touch control signal.

In the display device according to various embodiments of the present specification, the second control signal may alternately have the first gate high voltage and the first gate low voltage in the display period, have the first gate low voltage in the touch period, and have the second gate low voltage in the blank period.

According to various embodiments of the present specification, there is provided a display device including a display panel including a plurality of pixels and a plurality of touch electrodes disposed in a display area, a display driver that outputs a data voltage in a display period of an active period and outputs a touch driving signal in a touch period of the active period, and a demultiplexer disposed between the display area and the display driver and connected between an output terminal of the display driver and data lines of the display panel, in which the demultiplexer includes a first transistor electrically connecting the output terminal to a first data line among the data lines based on an odd control signal, and a second transistor electrically connecting the output terminal to the first data line based on an even control signal, in which the odd control signal alternately has a first gate high voltage and a first gate low voltage in the display period of an odd frame, has a second gate high voltage in the touch period of the odd frame, and has a second gate low voltage that is smaller than the first gate low voltage in a blank period of the odd frame.

In the display device according to various embodiments of the present specification, the odd control signal may have a third gate low voltage that is smaller than the first gate low voltage in the display period, the touch period, and the blank period of an even frame after the odd frame.

In the display device according to various embodiments of the present specification, the even control signal may alternately have the first gate high voltage and the first gate low voltage in the display period of the even frame, have the second gate high voltage in the touch period of the even frame, and have the second gate low voltage in the blank period of the even frame.

In the display device according to various embodiments of the present specification, the even control signal may have the third gate low voltage in the display period, the touch period, and the blank period of the odd frame.

The display device according to various embodiments of the present specification may further include a first control signal output unit that outputs the odd control signal, a second control signal output unit that outputs the even control signal, a first switching unit that supplies the first and second gate high voltages to each of the first and second control signal output units, a second switching unit that supplies the first to third gate low voltages to each of the first and second control signal output units, and a power supply unit that supplies the first and second gate high voltages to the first switching unit and supplies the first to third gate low voltages to the second switching unit.

According to the display device according to the embodiments of the present specification, it is possible to perform recovery by applying the first gate low voltage to the transistors of the demultiplexer during the active period and perform additional recovery by applying the second gate low voltage smaller than the first gate low voltage to the transistors of the demultiplexer during the blank period, thereby reducing a stress and deterioration.

According to the display device according to the embodiments of the present specification, it is possible to reduce the sizes and power consumption of the transistors of the demultiplexer.

However, effects obtainable from the present specification are not limited to the above-described effects, and other effects that are not mentioned will be able to be clearly understood by those skilled in the art to which the present specification pertains based on the following description.

Although one embodiment has been described above with reference to the accompanying drawings, those skilled in the art to which the specification pertains will be able to understand that the above-described technical configuration of the present invention can be carried out in other specific forms without changing the technical spirit or essential features thereof. Accordingly, it should be understood that the above-described embodiments are illustrative and not restrictive in all respects. In addition, the scope of the specification is described by the claims to be described below rather than the detailed description. In addition, the meaning and scope of the claims and all changed or modified forms derived from the equivalent concept should be construed as being included in the scope of the specification.

DESCRIPTION OF REFERENCE NUMERALS

10: display device 100: display panel
200: display driver 220: scan driver
500: timing controller 600: power supply unit
700: memory DMX: demultiplexer
T1, T2, T3, T4: first to fourth transistors
MUX1, MUX2: first and second control signals
MUXT: touch control signal
OMUX: odd control signal EMUX: even control signal

What is claimed is:

1. A display device comprising:
- a display panel including a plurality of pixels and a plurality of touch electrodes disposed in a display area;
- a display driver that outputs a data voltage in a display period of an active period and outputs a touch driving signal in a touch period of the active period; and
- a demultiplexer disposed between the display area and the display driver, the demultiplexer connected between a first output terminal of the display driver and data lines of the display panel, wherein the demultiplexer includes:
- a first transistor electrically connecting the first output terminal to a first data line from the data lines based on a first control signal; and
- a second transistor electrically connecting the first output terminal to a second data line from the data lines based on a second control signal, and
- wherein each of the first control signal and the second control signal alternately has a first gate high voltage and a first gate low voltage in the display period and has a second gate low voltage that is less than the first gate low voltage in a blank period that is after the active period.

2. The display device of claim 1, wherein each of the first control signal and the second control signal has a second gate high voltage that is less than the first gate high voltage in the touch period.

3. The display device of claim 2, further comprising:
- a first control signal output circuit that outputs the first control signal;
- a second control signal output circuit that outputs the second control signal;
- a first switching circuit that supplies the first gate high voltage and the second gate high voltage to each of the first control signal output circuit and the second control signal output circuit;
- a second switching circuit that supplies the first gate low voltage and the second gate low voltage to each of the first control signal output circuit and the second control signal output circuit; and
- a power supply circuit that supplies the first gate high voltage and the second gate high voltage to the first switching circuit and the first gate low voltage and the second gate low voltage to the second switching circuit.

4. The display device of claim 1, wherein each of the first control signal and the second control signal has a second gate high voltage that is equal to the first gate high voltage in the touch period.

5. The display device of claim 1, wherein the first transistor and the second transistor supply a data voltage to the first data line and the second data line, respectively, in the display period and supply a touch driving signal to the first data line and the second data line, respectively, in the touch period.

6. The display device of claim 1, wherein the demultiplexer includes:
- a third transistor electrically connecting a second output terminal of the display driver to a third data line from the data lines based on the first control signal; and
- a fourth transistor electrically connecting the second output terminal to a fourth data line from the data lines based on the second control signal.

7. A display device comprising:
- a display panel including a plurality of pixels and a plurality of touch electrodes disposed in a display area;
- a display driver that outputs a data voltage in a display period of an active period and outputs a touch driving signal in a touch period of the active period; and
- a demultiplexer between the display area and the display driver, the demultiplexer connected between an output terminal of the display driver and data lines of the display panel, wherein the demultiplexer includes:
- a first transistor electrically connecting the output terminal to a first data line from the data lines based on a first control signal; and
- a second transistor electrically connecting the output terminal to the first data line from the data lines based on a touch control signal, and
- wherein the first control signal alternately has a first gate high voltage and a first gate low voltage in the display period, has the first gate low voltage in the touch period, and has a second gate low voltage that is less than the first gate low voltage in a blank period after the active period.

8. The display device of claim 7, wherein the touch control signal has a third gate low voltage in the display period, a second gate high voltage in the touch period, and a fourth gate low voltage that is less than the third gate low voltage in the blank period.

9. The display device of claim 8, further comprising:
- a first control signal output circuit that outputs the first control signal;
- a second control signal output circuit that outputs the touch control signal;
- a first switching circuit that supplies the first gate high voltage to the first control signal output circuit and supplies the second gate high voltage to the second control signal output circuit;

a second switching circuit that supplies the first gate low voltage and second gate low voltage to the first control signal output circuit and supplies the third gate low voltage and the fourth gate low voltage to the second control signal output circuit; and a power supply circuit that supplies the first gate high voltage and the second gate high voltage to the first switching circuit and supplies the first gate low voltage to the fourth gate low voltage to the second switching circuit.

10. The display device of claim 8, wherein the second gate high voltage is less than the first gate high voltage, the first gate low voltage and the third gate low voltage are different, and the second gate low voltage and the fourth gate low voltage are different.

11. The display device of claim 8, wherein the first gate high voltage and the second gate high voltage are a same, the first gate low voltage and the third gate low voltage are a same, and the second gate low voltage and the fourth gate low voltage are a same.

12. The display device of claim 7, wherein the touch control signal has a third gate low voltage in the display period, alternately has a second gate high voltage and the third gate low voltage in the touch period, and has a fourth gate low voltage that is less than the third gate low voltage in the blank period.

13. The display device of claim 12, wherein a high pulse width of the touch control signal in the touch period is twice or more a low pulse width of the touch control signal.

14. The display device of claim 7, wherein the demultiplexer includes:

a third transistor electrically connecting the output terminal to a second data line from among the data lines based on a second control signal; and a fourth transistor electrically connecting the output terminal to the second data line based on the touch control signal.

15. The display device of claim 14, wherein the second control signal alternately has the first gate high voltage and the first gate low voltage in the display period, has the first gate low voltage in the touch period, and has the second gate low voltage in the blank period.

16. A display device comprising:

a display panel including a plurality of pixels and a plurality of touch electrodes disposed in a display area;

a display driver that outputs a data voltage in a display period of an active period and outputs a touch driving signal in a touch period of the active period; and a demultiplexer disposed between the display area and the display driver, the demultiplexer connected between an output terminal of the display driver and data lines of the display panel, wherein the demultiplexer includes:

a first transistor electrically connecting the output terminal to a first data line from the data lines based on an odd control signal; and a second transistor electrically connecting the output terminal to the first data line based on an even control signal, and wherein the odd control signal alternately has a first gate high voltage and a first gate low voltage in the display period of an odd frame, has a second gate high voltage in the touch period of the odd frame, and has a second gate low voltage that is less than the first gate low voltage in a blank period of the odd frame.

17. The display device of claim 16, wherein the odd control signal has a third gate low voltage that is less than the first gate low voltage in the display period, the touch period, and the blank period of an even frame after the odd frame.

18. The display device of claim 17, wherein the even control signal alternately has the first gate high voltage and the first gate low voltage in the display period of the even frame, has the second gate high voltage in the touch period of the even frame, and has the second gate low voltage in the blank period of the even frame.

19. The display device of claim 17, wherein the even control signal has the third gate low voltage in the display period, the touch period, and the blank period of the odd frame.

20. The display device of claim 17, further comprising:

a first control signal output circuit that outputs the odd control signal;

a second control signal output circuit that outputs the even control signal;

a first switching circuit that supplies the first gate high voltage and the second gate high voltage to each of the first control signal output circuit and the second control signal output circuit;

a second switching circuit that supplies the first gate low voltage to a third gate low voltage to each of the first control signal output circuit and the second control signal output circuit; and a power supply circuit that supplies the first gate high voltage and the second gate high voltage to the first switching circuit and supplies the first gate low voltage to the third gate low voltage to the second switching circuit.

* * * * *